(12) United States Patent
Blaiklock et al.

(10) Patent No.: US 9,328,949 B2
(45) Date of Patent: May 3, 2016

(54) COMPRESSOR SURGE CONTROL SYSTEM AND METHOD

(75) Inventors: Paul Musgrave Blaiklock, Roanoke, VA (US); Barry Earl Dick, Salem, VA (US)

(73) Assignee: TMEIC Corporation, Roanoke, VA (US)

( * ) Notice: Subject to any disclaimer, the term of this patent is extended or adjusted under 35 U.S.C. 154(b) by 597 days.

(21) Appl. No.: 13/255,932

(22) PCT Filed: Mar. 29, 2010

(86) PCT No.: PCT/US2010/029012
§ 371 (c)(1),
(2), (4) Date: Sep. 12, 2011

(87) PCT Pub. No.: WO2010/114786
PCT Pub. Date: Oct. 7, 2010

(65) Prior Publication Data
US 2012/0014812 A1    Jan. 19, 2012

Related U.S. Application Data

(60) Provisional application No. 61/164,641, filed on Mar. 30, 2009.

(51) Int. Cl.
*F04D 27/02* (2006.01)
*F25B 49/02* (2006.01)
*F04D 27/00* (2006.01)

(52) U.S. Cl.
CPC ............ *F25B 49/025* (2013.01); *F04D 27/001* (2013.01); *F04D 27/0207* (2013.01);
(Continued)

(58) Field of Classification Search
CPC ... F04D 27/001; F04D 27/02; F04D 27/0261; F04D 27/0207; F04D 27/0215; F04D 27/0223

USPC .............. 417/19, 20; 415/17; 62/228.1, 230
See application file for complete search history.

(56) References Cited

U.S. PATENT DOCUMENTS

| 4,164,035 A | 8/1979 | Glennon et al. |
| 4,581,900 A | 4/1986 | Lowe et al. |

(Continued)

FOREIGN PATENT DOCUMENTS

| JP | S60093197 | 5/1985 |
| JP | H06346893 A | 12/1994 |

(Continued)

OTHER PUBLICATIONS

Co-Pending Application No. JP 2012-503547, First Office Action English Translation, dated Feb. 28, 2014, 5 pages.

(Continued)

*Primary Examiner* — Patrick Hamo
(74) *Attorney, Agent, or Firm* — New River Valley IP Law, P.C.; Michele L. Mayberry

(57) ABSTRACT

A system and method for controlling gas surges in compressors powered by electric motors. An adjustable speed drive (ASD) incorporating a microprocessor powered by a three-phase source of electricity controls the electric motor which drives the compressor. A bypass valve is inserted between the gas input of the compressor and the gas discharge. The bypass valve opens in response to signals from the ASD which detects gas surges by analyzing a stored surge map which plots a surge line and a related discretionary control line based on the power and speed of the motor. When the operating point of the motor crosses the control line, the ASD causes the bypass valve to open.

17 Claims, 5 Drawing Sheets

(52) U.S. Cl.
CPC ..... *F04D27/0261* (2013.01); *F25B 2400/0401* (2013.01); *F25B 2600/021* (2013.01); *Y02B 30/741* (2013.01)

(56) References Cited

U.S. PATENT DOCUMENTS

| | | | |
|---|---|---|---|
| 4,608,833 | A | 9/1986 | Kountz |
| 4,686,834 | A | 8/1987 | Haley et al. |
| 4,753,711 | A | 6/1988 | Bolton et al. |
| 4,949,276 | A | 8/1990 | Staroselsky et al. |
| 5,553,997 | A | 9/1996 | Goshaw et al. |
| 5,746,062 | A | 5/1998 | Beaverson et al. |
| 5,798,941 | A * | 8/1998 | McLeister .............. 700/282 |
| 5,894,736 | A | 4/1999 | Beaverson et al. |
| 2006/0245944 | A1 | 11/2006 | Leck et al. |
| 2008/0145728 | A1 | 6/2008 | Rainville |

FOREIGN PATENT DOCUMENTS

| | | | |
|---|---|---|---|
| JP | H07012090 | | 1/1995 |
| JP | 2000505525 | A | 5/2000 |
| JP | 2006316759 | A | 11/2006 |
| JP | 2009047059 | A | 3/2009 |

OTHER PUBLICATIONS

Co-Pending Application No. JP 2012-503547, First Office Action, dated Feb. 28, 2014, 4 pages.
B. Bohagen, J.T. Gravdahl. "Active Surge Control of Compression System Using Drive Torque," Automatica 44 (2008) pp. 1135-1140.
International Application No. PCT/US10/029012, International Preliminary Report on Patentability, Oct. 4, 2011.
International Application No. PCT/US10/029012, International Search Report, May 21, 2010.
International Application No. PCT/US10/029012, Written Opinion, May 21, 2010.
K. O. Boinov, et al. "The Intermediate Prototype Development of the Compressor Drive for a Fuel Cell Power System". 10th Annual European Conference on Power Electronics and Applications. Sep. 2-4, 2003.
Co-Pending Application No. JP 2012-503547, English Translation of Response to First Office Action, dated May 30, 2014, 13 pages.
Co-Pending Application No. JP 2012-503547, Response to First Office Action, dated May 30, 2014, 12 pages.
Co-Pending Application No. JP 2012-503547, Office Action dated Dec. 22, 2014, 2 pages.
Co-Pending Application No. JP 2012-503547, English Translation of Dec. 22, 2014, Office Action, 2 pages.
Co-Pending Application No. JP 2012-503547, English Version of Response to Dec. 22, 2014 Office Action filed Mar. 18, 2015, 6 pages.
Co-Pending Application No. JP 2012-503547, Response to Dec. 22, 2014 Office Action, filed Mar. 18, 2015, 3 pages.
Co-Pending Application No. EP 10759254.5 filed Oct. 28, 2011 and Published as EP 2414748 on Feb. 8, 2012.
Co-Pending Application No. JP 2012-503547, Decision of Grant dated Aug. 4, 2015 (no English translation available), 3 pages.
Co-Pending Application No. JP 2012-503547, Issued as Patent No. JP 5805068 dated Sep. 11, 2015, 2 pages.
Co-Pending Application No. KP 10-2011-7025525 filed Oct. 27, 2011 and Published as KP 10-2012-0003912 on Jan. 11, 2012.

* cited by examiner

PRIOR ART

COMPRESSOR SURGE CONTROL SYSTEM AND METHOD

CROSS-REFERENCES TO RELATED APPLICATIONS

This application claims priority from U.S. provisional application 61/164,641 filed on Mar. 30, 2009, which is incorporated herein by reference in its entirety.

TECHNICAL FIELD

The subject invention relates generally to a process control system to protect electric motor driven compressors from damage caused by gas flow surge, in applications on pipelines, liquefied natural gas plants, and other industrial installations. More particularly, the system and method employ an adjustable speed drive as a surge controller.

BACKGROUND OF THE INVENTION

Surge on compressors is a serious problem, causing severe vibration, and sometimes damage to the rotating equipment. A typical surge control system as known in the prior art is shown in FIG. 1 in which motor 5 drives compressor 10. Gas flows into compressor 10 along pipe 15 into low pressure input suction pipe 20 and is discharged along pipe 25 into gas output pipe 30. Gas flow is measured and monitored by surge controller 35 along line 40 while suction pressure, if this is known to change, is measured and monitored along line 45 and discharge pressure is measured and monitored along line 50. In simplified terms, surge results from excessive pressure in the compressor discharge along pipe 25 causing the gas flow to reverse back into compressor 10. Surge is controlled with a large bypass valve 55 which allows high pressure gas at the discharge to flow back into low pressure suction pipe 20, thus relieving the pressure. Bypass valve 55 is controlled by surge controller 35 along signal line 60. Other devices besides a simple bypass valve may also be used. For example, a spring-loaded blow-off valve which dumps high discharge pressure gas to a flare (burner) is a possibility. However, such a valve has to be set low and is wasteful and expensive if used very much. A third similar mechanism is a spring-loaded relief valve on the discharge which opens when the pressure reaches a preset high value and dumps gas back to the suction. This type of valve also has to be set low to be safe and has the same drawbacks as previously described.

During factory testing of compressor 10, pressure and flow are measured at a range of rotating speeds, and the onset of surge carefully measured and drawn on a two-dimensional Surge Map in graphical form displaying the relationship between input gas flow and discharge pressure. For each pressure and flow point, the corresponding horsepower and motor speed are measured and drawn on the map, as shown in FIG. 2. This map is used to program surge controller 35 so that it opens bypass valve 55 if flow conditions approach the surge limit as shown in FIG. 2. If the suction pressure can also change in the particular configuration, the vertical axis of FIG. 2 is modified so as to represent a pressure ratio (discharge pressure/suction pressure) and thus create a similar shaped set of curves which are used for surge control.

During normal compressor operation, operating point X is in the safe operating area which is that area to the right of control line A, as shown in FIG. 3 which presents a surge map in graphical form of the relationship between compressor suction flow on the horizontal axis and compressor discharge at various operating points on the vertical axis. Control line A itself is programmed into the controller a discretionary amount to the right of surge line B to provide a margin of safety in system operation. If, due to changing process conditions or compressor speed change, the operating point moves across control line A, controller 35 starts to open bypass valve 55 to relieve the discharge pressure and bring compressor 10 back into the safe operating area. FIG. 3 also shows the relationship of compressor suction flow to compressor discharge pressure at various exemplary constant speeds C, D, E, F and G, in RPM of motor 5. As those constant speeds increase, the relative suctions flow and pressure also increase.

Surge controller 35 has a Proportional plus Integral (PI) controller 100 having as inputs at 115 the operating point from the surge controller map and, at 120, the set point from the control line from the surge controller map. PI 100 develops a current output 105, as shown in FIG. 4. The current output is converted by a converter at 110 to either air pressure or hydraulic pressure to actuate bypass valve 55, which is normally closed. When a control error is detected, PI 100 generates an output which starts to open valve 55 to allow bypass flow. As the error diminishes, the output decreases, and the valve closes. Adaptive control can be added to the PI to control for special conditions.

The traditional surge control system described above requires at least three sensors to measure gas flow, suction pressure and discharge pressure as well as a microprocessor-based surge controller. A simpler, more reliable, and less expensive surge control system would be a benefit to users.

SUMMARY OF THE INVENTION

This invention relates to a system and method for preventing gas surges in industrial compressors powered by electric motors. The system has a gas input line and a gas output line. A low pressure input suction line is connected between the gas input line and an input into the compressor. A gas discharge line is connected between the gas output line and an output from the compressor. Bypass means, which may comprise an air/hydraulic converter connected to a bypass valve, is connected between the gas discharge line and the low pressure input line. An adjustable speed drive (ASD) incorporating a microprocessor is powered by a three-phase electric power supply and is connected between the electric motor and the bypass means. The ASD generates and stores a two-dimensional compressor surge map from which it determines the occurrence of a gas surge in the gas discharge line. If such an occurrence is detected, the bypass valve is caused to close by sending a signal to an air/hydraulic converter connected to the bypass valve, and the speed and power of the electric motor may be modified. An alternative embodiment provides redundant control of the bypass means by adding an ASD to preexisting systems relying on surge controllers operating based on pressure and flow information provided by multiple sensors.

A method of surge control is also disclosed in which the microprocessor in the ASD generates a two-dimensional surge map based on the speed and power of the compressor used by the system which includes a graphical representation of a surge line indicating the points at which an undesirable surge will occur for any given speed or power. A further graphical control line is generated spaced a discretionary distance at all points away from the surge line so that at any given speed the control line indicates a higher compressor horsepower and that at any given compressor horsepower the control line indicates a lower speed. The graph, including the surge line and the control line, are stored in the microprocessor subject to modification based on optional additional inputs such as gas temperature and suction pressure at the input of the compressor. At least every five milliseconds, the microprocessor examines the operating point of the compressor in terms of speed and power to determine if that point is equal to or greater than any point on the control line. If so, an analog signal is issued to the bypass valve via the air/hydraulic converter instructing the valve to open. If not, and the valve has already been instructed to open, a closing instruction is sent. In the alternative embodiment providing redundant surge control, the method provides for controlling the bypass valves in response to the larger of the signals sent from the ASD and the surge controller in the event that they differ.

BRIEF DESCRIPTION OF THE DRAWINGS

The foregoing and other objects, aspects and advantages of the invention will be better understood from the following detailed description of the invention with reference to the drawings, in which FIG. 1 displays in block diagram form a typical surge control system as known in the art.

DETAILED DESCRIPTION OF THE INVENTION

Figure 1:
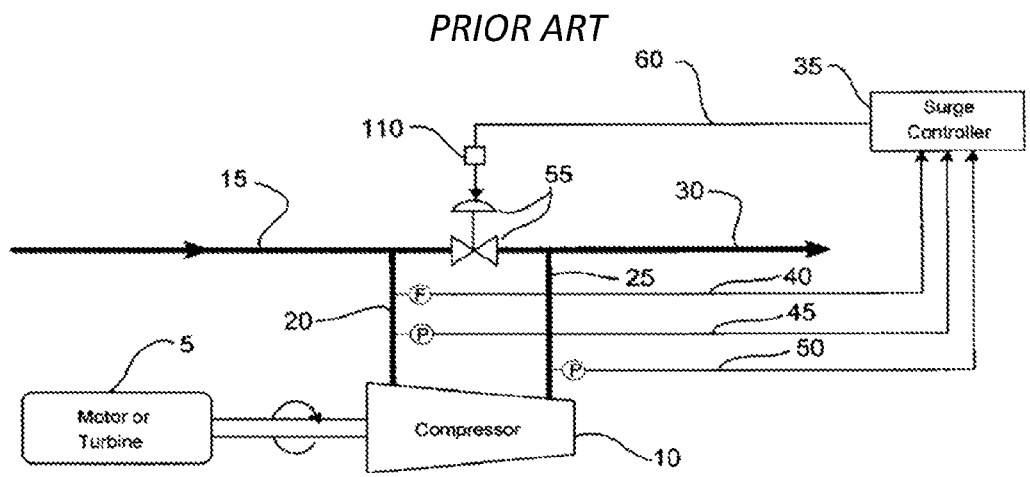
Figure 3:
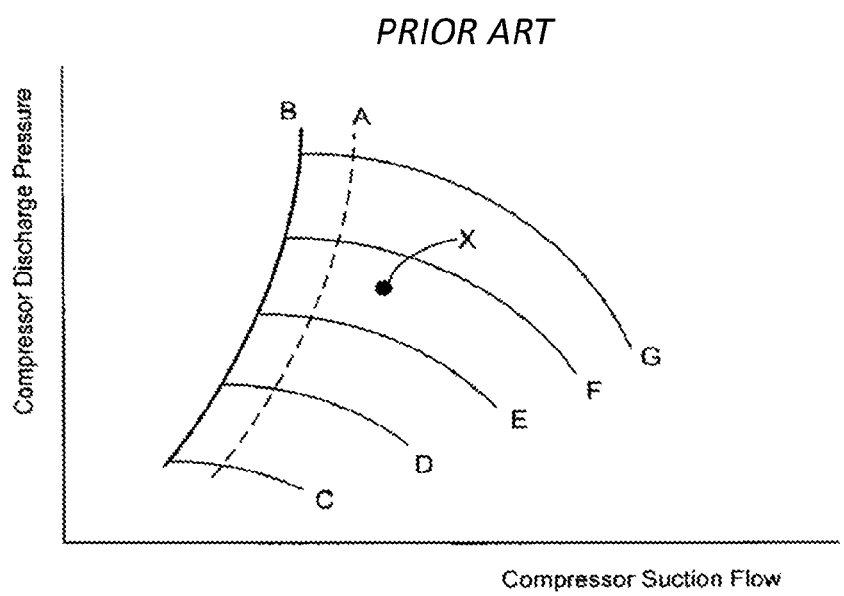
FIG. 3 is a surge map in graphical form of the relationship between compressor suction flow and compressor discharge pressure showing a control line.
Figure 5:
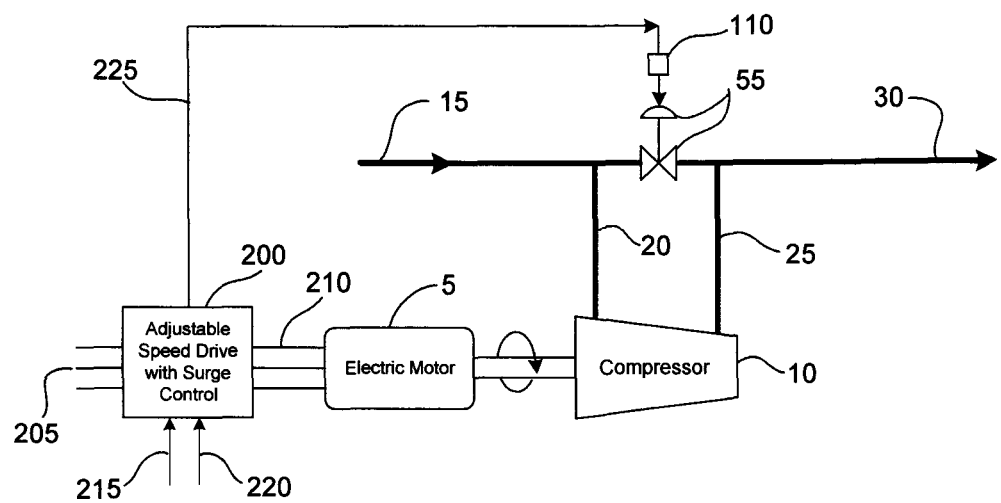
FIG. 5 is a block diagram of apparatus embodying the principles of the invention.

The apparatus for the preferred embodiment of this invention is shown in FIG. 5 in which electric motor 5 powers compressor 10 which has low pressure input suction pipe 20 connected to gas input flow pipe 15 and compressor gas discharge pipe 25 connected to gas output pipe 30, as in FIG. 1. However, when a compressor is used, such as those manufactured for such uses by GE Oil & Gas, Dresser Rand, Mitsubishi, and Siemens, electric motor 5 is controlled by adjustable speed drive (ASD) 200 which is used to smoothly start motor 5 and control the speed of compressor 10, as shown in FIG. 5. ASD 200 is powered by three-phase electric power supply 205 and generates variable frequency three-phase power over lines 210 that feed motor 5, thus controlling the motor speed and power. Any ASD may be used for this purpose so long as it is sized appropriately to match and control motor 5 and includes a microprocessor-based control. Examples of ASDs usable in arrangements of the type disclosed herein are the Dura-Bilt5i MV and the TMdrive-XL85, both of which are manufactured by Toshiba Mitsubishi-Electric Industrial Systems Corporation. Electric motors compatible with such compressors are produced by companies such as Toshiba Mitsubishi-Electric Industrial Systems Corporation, GE and Siemens.

Figure 2:
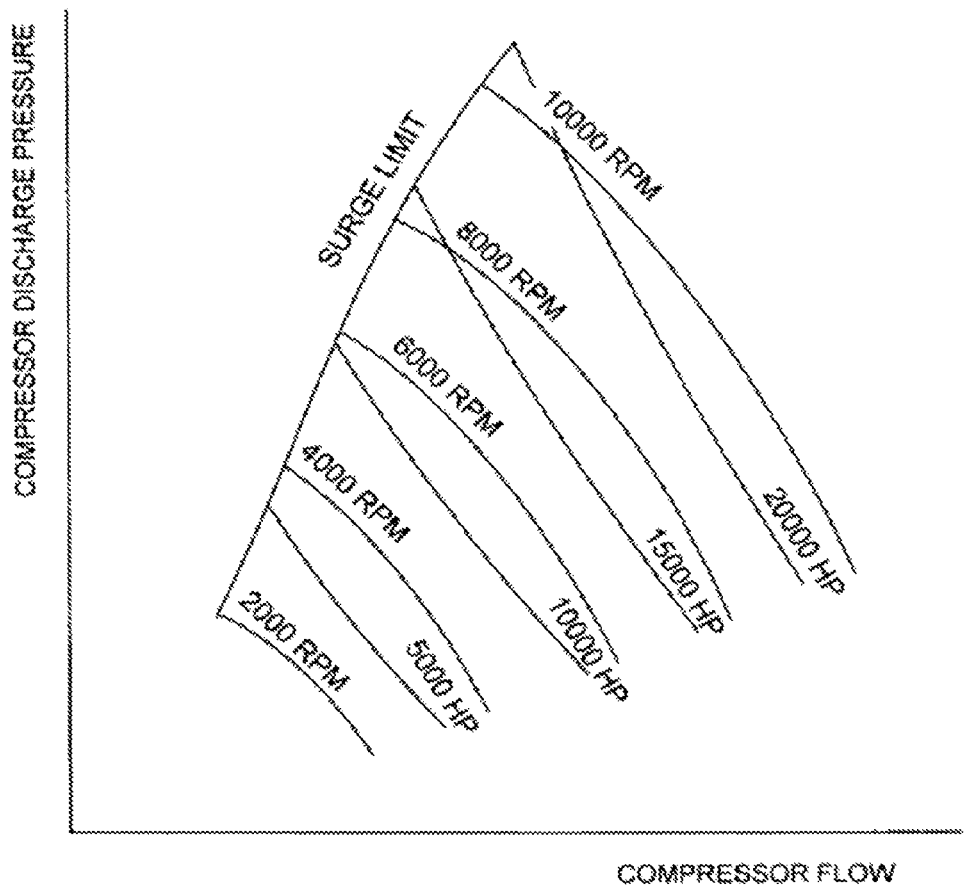
FIG. 2 is a typical two-dimensional surge map in graphical form of the relationship between gas flow and discharge pressure at various motor horsepower and speeds.
Figure 4:
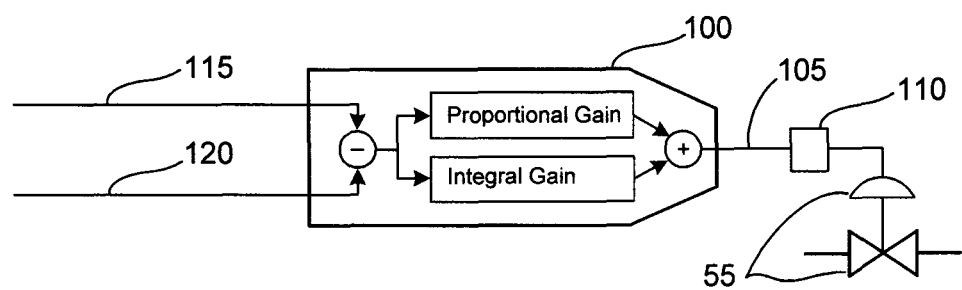
FIG. 4 is a block diagram illustrating the PI portion of a surge controller and a bypass valve.
Figure 6:
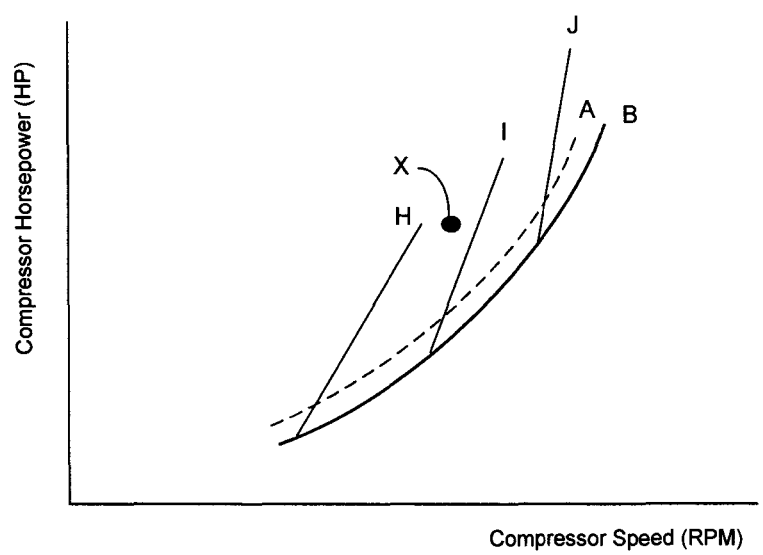
FIG. 6 is a graphic representation of a compressor surge map based on compressor power and speed.

When an ASD and electric motor are used to power a compressor, there is a correspondence both between the compressor pressure and the compressor flow points and the ASD power and the motor speed points. Since the ASD frequency corresponds to electric motor speed, a compressor surge map can be created and stored in the ASD in the form of a power/speed two-dimensional surge map so long as the ASD has data storage capability. In the ASD, power and speed are represented by kW and Frequency and are readily available. FIG. 6 is a graphic representation of such a surge map showing a compressor operating at point X in the safe area which in this case is to the left of control line A where the vertical axis represents compressor horsepower and the horizontal axis represents compressor speed expressed as RPM. The unsafe area is that part of the figure beginning at and to the right of control line A and including surge line B. Control line A is located a discretionary distance away from surge line B. The constant pressure lines H, I and J are shown to indicate the one to one correspondence between this surge map and that shown in FIG. 2, although these lines play no role in effectuating surge control as regards establishment of the operating point, control line or surge line.

The ASD continually monitors its output voltage and current, and, if the load on the motor increases, the ASD power output increases immediately. Therefore the ASD is sensitive to the load (HP) on the motor at all times. Similarly the ASD generates the frequency desired by the user, so it is also sensitive to the motor speed at all times.

Figure 8:
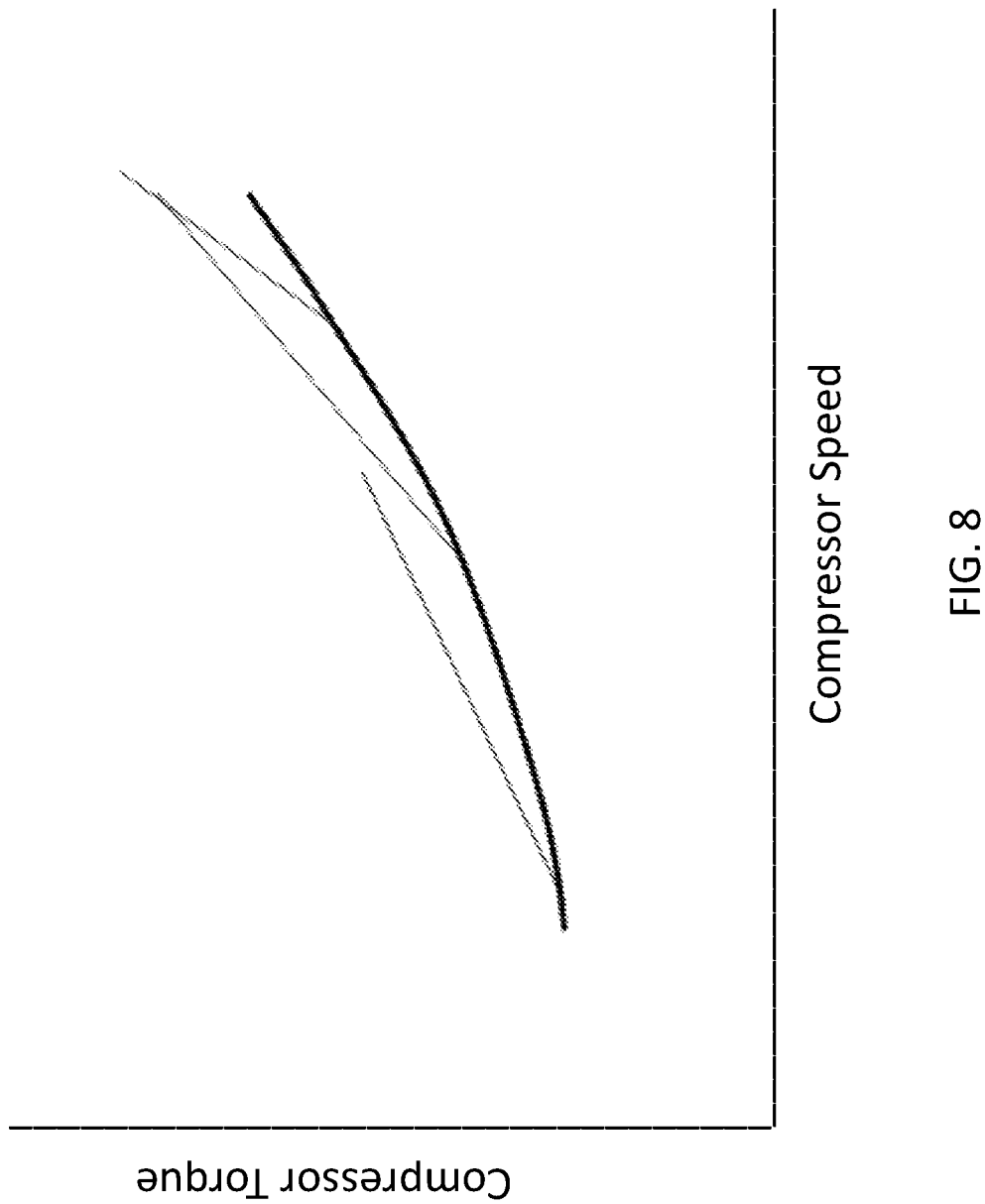
FIG. 8 is a graphic representation of a compressor surge map based on compressor torque and speed.

Alternatively, a different ASD surge map can be used derived from a two dimensional motor torque-speed map. Since the ASD knows the synchronous motor frequency, and continually measures motor current which is an indication of motor torque, then this type of map may also be created and stored in the ASD and function as a surge map. FIG. 8 is a graphic representation of such a surge map.

If the gas input temperature along line 15 to compressor 10 changes appreciably during operation, the compressor surge map may be altered. Such temperature data may be monitored and provided as an optional analog input to the microprocessor on line 215 to ASD 200 resulting in modification to the surge map to compensate appropriately when necessary. Similarly, compressor suction pressure may be optionally monitored and provided to ASD 200 along line 220 to further modify the surge map.

Since ASD 200 has its own microprocessor, it can either run the Proportional plus Integral (PI) control algorithm in its microprocessor or be connected to a separate external PI controller. Using the stored two-dimensional ASD surge map with a preprogrammed control line located a discretionary distance away from the surge line, ASD 200 can determine when a control error occurs based on input to the PI at 115 of the operating point from the ASD surge map and at 120 of the set point from the control line from the ASD surge map. In the event of an error, a surge control signal is issued along line 225 to directly actuate compressor bypass valve 55 which may be of one of the types discussed above. Other options also exist, for example, ASD 200 can issue a surge alarm to the process control system through its local area network port, or change the compressor speed or torque if required, or do any combination of these. Once the surge error is no longer detected, the surge control signal decreases and the bypass valve closes.

Figure 7:
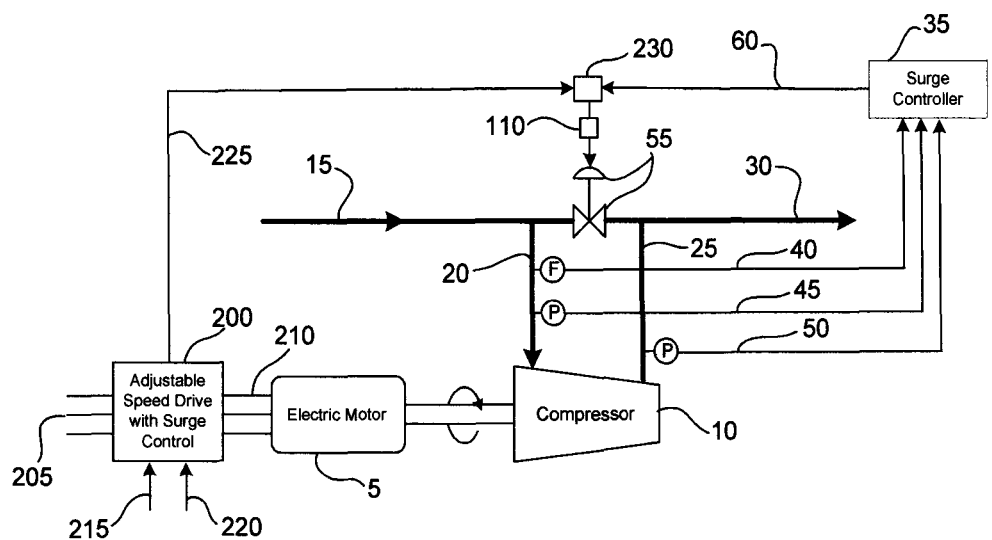
FIG. 7 is a block diagram of alternative apparatus embodying the principles of the invention.

An alternative embodiment of the apparatus of this invention is shown in FIG. 7. This arrangement can be used to add the surge control system of this invention to compressors which already employ a traditional surge control system to provide redundant control of bypass valve 55. In this embodiment, first analog signal 60 from the surge controller and second analog signal 225 from the ASD are continuous currents varying from 4 to 20 ma, representing 0 to 100% of signal value. At 230, a device, such as, but not limited to, an Upper Selector, compares the two analog signals and passes the larger of the two input signals to bypass valve 55. This arrangement is used both for opening bypass valve 55 to prevent surges and for closing bypass valve 55 after a surge or potential surge has been prevented. If either signal fails and drops to zero, the other signal operates bypass valve 55, as required, which provides the redundancy. According to this arrangement, the system does not need to know what bypass valve 55 is doing which makes it more reliable.

This invention provides improved surge control to the traditional stand-alone surge controller. This alternative does not use three sensors, so it offers higher reliability and lower cost. For those compressors that already have a traditional surge control, the invention offers a low cost redundant surge control which can be added. In such a dual configuration, either of the systems can control the bypass valve, thus increasing the overall reliability of the system by an order of magnitude. Since these compressor trains are very expensive and generate large revenues, the increased reliability of the safety system and lower probability of equipment damage by surge provided by this invention are significant advantages. Moreover, use of an ASD provides direct control of motor speed and torque which the customer can use for control purposes if desired, for example, to temporarily change speed to move conditions away from the surge line. Finally, the system of this invention provides a faster acting surge signal than a stand-alone external surge controller because the drive current reacts almost instantaneously to motor torque changes, and the drive executes its control algorithm approximately every five milliseconds.

The foregoing invention has been described in terms of a preferred embodiment. However, it will be apparent to those skilled in the art that various modifications and variations can be made to the disclosed apparatus and method without departing from the scope or spirit of the invention and that legal equivalents may be substituted for the specifically disclosed elements of the invention. The specification and examples are exemplary only, while the true scope of the invention is defined by the following claims.

What is claimed is:

1. A system in a process control arrangement for preventing gas surge in an industrial compressor having a gas input and a gas output wherein the compressor is driven by an electric motor powered by a three-phase electric power supply comprising:
    a system gas input supply line;
    a system gas output line;
    a low pressure input suction line connected between said gas input supply line and the input of the compressor;
    a gas discharge line connected between the output of the compressor and said gas output line;
    bypass means connected between said gas discharge line and said low pressure input suction line for relieving excess pressure in said compressor gas discharge line; and
    adjustable speed drive (ASD) means powered by a three-phase electric power supply and connected to the electric motor;
    wherein stored in the ASD means is a two-dimensional compressor surge map for determining the occurrence of a gas surge in said gas discharge line based on the surge map, for reacting to the detection of such a surge with said bypass means being actuated by said ASD means, and for controlling the speed and power of the motor if required;
    wherein the two-dimensional surge map is based on power and speed of the electric motor and a graphical representation of the two-dimensional surge map comprises a first axis representing power and a second axis representing speed.

2. The system of claim 1 wherein said adjustable speed drive means further includes
    a Proportional plus Integral (PI) controller having as inputs an operating point of the compressor as plotted on the stored surge map and a control line indicating points at which surge control is necessary as plotted on the stored surge map and one output;
    a microprocessor capable of controlling said PI controller and running a PI algorithm; and
    a control line running from said ASD means to said bypass means.

3. The system of claim 1 further including
    temperature sensor means for measuring and collecting data representing the temperature of gas input to the compressor and for supplying that data to said ASD means; or
    pressure sensor means for measuring and collecting data representing pressure at said low pressure input suction line and for supplying that data to said ASD means, or both to modify the surge map if necessary with new pressure data, new temperature data, or both the new pressure and temperature data.

4. The system of claim 1 wherein upon detection of a gas surge, said ASD means causes one or more of the following actions to occur: actuation of said bypass means, transmission of a surge alarm to a process controller, or modifying the speed or torque of the compressor.

5. The system of claim 1 wherein said bypass means further comprises an air/hydraulic converter and a bypass valve.

6. The system of claim 1 wherein the adjustable speed drive (ASD) means comprises a microprocessor.

7. The system of claim 6 wherein the two-dimensional surge map is stored in the microprocessor of the ASD means.

8. The system of claim 6 wherein the ASD means is capable of actuating a bypass valve of the bypass means by sending a signal to an air/hydraulic converter.

9. The system of claim 6 wherein the ASD means is capable of determining, at a selected timing interval, an operating point of the compressor as expressed in terms of operating horsepower and speed of the electric motor.

10. The system of claim 9 wherein the ASD means is capable of determining whether the operating point of the compressor coincides with or crosses a control line.

11. The system of claim 10 wherein when the operating point of the compressor coincides with or crosses the control line the ASD means issues an analog signal to a bypass valve of the bypass means instructing the bypass valve to open.

12. The system of claim 10 wherein when the operating point of the compressor does not coincide with or cross the control line, and a bypass valve of the bypass means is open, the ASD means issues an analog signal to instruct the bypass valve to close.

13. The system of claim 1 wherein the two-dimensional surge map includes a graphical representation of a surge line indicating points at which an undesirable surge will occur for a given speed and power.

14. The system of claim 13 wherein the ASD means comprises a microprocessor capable of receiving gas input temperature and suction pressure of the compressor and capable of modifying the surge line if needed in response to the temperature and pressure data.

15. The system of claim 13 wherein the two-dimensional surge map includes a graphical representation of a control line spaced a distance from the surge line.

16. A system in a process control arrangement for preventing gas surge in an industrial compressor having a gas input and a gas output wherein the compressor is driven by an electric motor powered by a three-phase electric power supply comprising:
- a system gas input supply line;
- a system gas output line;
- a low pressure input suction line connected between said gas input supply line and the input of the compressor;
- a gas discharge line connected between the output of the compressor and said gas output line;
- bypass means connected between said gas discharge line and said low pressure input suction line for relieving excess pressure in said compressor gas discharge line; and
- adjustable speed drive (ASD) means powered by a three-phase electric power supply and connected to the electric motor;
- wherein stored in the ASD means is a two-dimensional compressor surge map for determining the occurrence of a gas surge in said gas discharge line based on the surge map, for reacting to the detection of such a surge with said bypass means being actuated by said ASD means, and for controlling the speed and power of the motor if required;
- wherein the two-dimensional surge map is based on torque and speed of the electric motor.

17. The system of claim 16, wherein a graphical representation of the two-dimensional surge map comprises a first axis representing torque and a second axis representing speed.

* * * * *